US012802838B2

(12) United States Patent
Zhu et al.

(10) Patent No.: US 12,802,838 B2
(45) Date of Patent: Nov. 17, 2026

(54) CONDUCTIVE BAR, CONDUCTIVE BAR ASSEMBLY, AND VEHICLE ELECTRICAL DEVICE SYSTEM

(71) Applicant: BYD COMPANY LIMITED, Shenzhen (CN)

(72) Inventors: Liang Zhu, Shenzhen (CN); Qiang Guo, Shenzhen (CN); Danhua Wen, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 193 days.

(21) Appl. No.: 18/988,989

(22) Filed: Dec. 20, 2024

(65) Prior Publication Data

US 2025/0125067 A1 Apr. 17, 2025

Related U.S. Application Data

(63) Continuation of application No. PCT/CN2023/090737, filed on Apr. 26, 2023.

(30) Foreign Application Priority Data

Jun. 30, 2022 (CN) ........................ 202210760496.7

(51) Int. Cl.
*H01B 5/02* (2006.01)
*H01R 25/16* (2006.01)

(52) U.S. Cl.
CPC ............ *H01B 5/02* (2013.01); *H01R 25/161* (2013.01); *H01R 2201/26* (2013.01)

(58) Field of Classification Search
CPC ........................................................ H01B 5/02
See application file for complete search history.

(56) References Cited

U.S. PATENT DOCUMENTS

| | | | | |
|---|---|---|---|---|
| 2008/0123256 A1* | 5/2008 | Fuzetti | H01R 4/363 174/99 B |
| 2020/0227897 A1 | 7/2020 | Abe et al. | |
| 2021/0090496 A1 | 3/2021 | Yue et al. | |
| 2021/0134480 A1 | 5/2021 | Dawson et al. | |
| 2026/0045385 A1* | 2/2026 | Yanagihara | H01B 5/02 |
| 2026/0112519 A1* | 4/2026 | Watabe | H01B 5/02 |

FOREIGN PATENT DOCUMENTS

| | | |
|---|---|---|
| CN | 202217732 U | 5/2012 |
| CN | 105339513 A | 2/2016 |
| CN | 105719730 A | 6/2016 |

(Continued)

*Primary Examiner* — Hung V Ngo
(74) *Attorney, Agent, or Firm* — Calfee, Halter & Griswold LLP

(57) ABSTRACT

A conductive bar, a conductive bar assembly, and a vehicle electrical device system. The conductive bar is configured to be electrically connected between two electrical devices, and the conductive bar includes at least one connecting section. The elastic modulus of the connecting section is E, the width of the connecting section is ω, the thickness of the connecting section is δ, and the thickness δ of the connecting section satisfies: $\sqrt{\lambda\omega^3/E} \leq \delta \leq 10\sqrt{\lambda\omega^3/E}$, wherein λ=0.085 Gpa/mm, the units of ω and δ are both mm, the unit of E is Gpa, and E is in the range of 55 Gpa to 120 Gpa.

20 Claims, 8 Drawing Sheets

(56) References Cited

FOREIGN PATENT DOCUMENTS

| | | | |
|---|---|---|---|
| CN | 210137025 | U | 3/2020 |
| CN | 111446029 | A | 7/2020 |
| CN | 215644878 | U | 1/2022 |
| JP | 2007321167 | A | 12/2007 |
| JP | 2012169215 | A | 9/2012 |
| JP | 2014010955 | A | 1/2014 |
| JP | 2017051962 | A | 3/2017 |
| JP | 6193070 | B2 | 9/2017 |
| JP | 2017172034 | A | 9/2017 |
| JP | 2018168396 | A | 11/2018 |

* cited by examiner

CONDUCTIVE BAR, CONDUCTIVE BAR ASSEMBLY, AND VEHICLE ELECTRICAL DEVICE SYSTEM

CROSS-REFERENCE TO RELATED APPLICATIONS

The present disclosure is a bypass continuation of PCT International Application No. PCT/CN2023/090737, filed on Apr. 26, 2023, which claims priority to and benefits of Chinese Patent Application No. 202210760496.7, filed on Jun. 30, 2022, entitled "CONDUCTIVE BAR, CONDUCTIVE BAR ASSEMBLY, AND VEHICLE ELECTRICAL DEVICE SYSTEM". The entire contents of the above-referenced applications are incorporated herein by reference.

FIELD

The present disclosure relates to the field of conductive bar technologies, and in particular, to a conductive bar, a conductive bar assembly, and a vehicle electrical device system.

BACKGROUND

Electrical devices on a vehicle are usually connected by a conductive bar. During traveling of the vehicle under long-term vibratory road conditions, stress concentration may occur in the conductive bar during long-term use, causing fractures in the conductive bar due to vibration during work. As a result, a conductive bar assembly of the vehicle is not durable, and the vehicle cannot achieve high mileage under actual road conditions.

SUMMARY

An objective of the present disclosure is to provide a conductive bar, a conductive bar assembly, and a vehicle electrical device system. The conductive bar can be used under long-term vibratory road conditions, to avoid fractures in the conductive bar due to vibration during work, and resolve the problem of stress concentration in the conductive bar during long-term use, thereby ensuring that a conductive bar assembly manufactured and formed by using the conductive bar is reliable and durable and the vehicle can achieve high mileage under actual road conditions.

The present disclosure provides a conductive bar, configured to be electrically connected between two electrical devices. The conductive bar includes at least one connecting section. An elastic modulus of the connecting section is E. A width of the connecting section is ω. A thickness of the connecting section is δ. The thickness δ of the connecting section satisfies $\sqrt{\lambda\omega^3/E}\leq\delta\leq10\sqrt{\lambda\omega^3/E}$. λ=0.085 Gpa/mm. Units of ω and δ are both mm. A unit of E is Gpa. E is in a range of 55 Gpa to 120 Gpa.

In some embodiments, the thickness δ of the connecting section satisfies $$\sqrt{\lambda\omega^3/E}\leq\delta\leq6\sqrt{\lambda\omega^3/E},\ \sqrt{\lambda\omega^3/E}\leq\delta\leq5\sqrt{\lambda\omega^3/E},$$
$$\sqrt{\lambda\omega^3/E}\leq\delta\leq4\sqrt{\lambda\omega^3/E},\ \sqrt{\lambda\omega^3/E}\leq\delta\leq3\sqrt{\lambda\omega^3/E},$$
$$\text{or } \sqrt{\lambda\omega^3/E}\leq\delta\leq2\sqrt{\lambda\omega^3/E}.$$

In some embodiments, multiple connecting sections are provided, the multiple connecting sections include a first connecting section, a second connecting section, and a third connecting section, and the second connecting section and the third connecting section are respectively arranged at two opposite ends of the first connecting section and are respectively configured to be electrically connected to the two electrical devices.

In some embodiments, an extending direction of the first connecting section is parallel to a first direction, extending directions of the second connecting section and the third connecting section are both parallel to a second direction, and the first direction is perpendicular to the second direction.

In some embodiments, the conductive bar has a planar plate shape, the second direction being perpendicular to a thickness direction of the first connecting section.

In some embodiments, the conductive bar has a three-dimensional structure, the second direction being parallel to a thickness direction of the first connecting section.

In some embodiments, the multiple connecting sections further include a first transition section and a second transition section, the first transition section is connected between the first connecting section and the second connecting section, and the second transition section is connected between the first connecting section and the third connecting section.

In some embodiments, an included angle between an extending direction of the second connecting section and an extending direction of the first connecting section ranges from 45° to 135°, and an included angle between an extending direction of the third connecting section and the extending direction of the first connecting section ranges from 45° to 135°.

In some embodiments, a bending direction of the first transition section is opposite to a bending direction of the second transition section.

In some embodiments, a fixing hole is provided in the first connecting section, the fixing hole penetrates the first connecting section along the thickness direction of the first connecting section, a first connecting hole is provided in the second connecting section, the first connecting hole penetrates the second connecting section along a thickness direction of the second connecting section, a second connecting hole is provided in the third connecting section, and the second connecting hole penetrates the third connecting section along a thickness direction of the third connecting section.

In some embodiments, the conductive bar includes a conductive body and an abrasion-resistant layer covering a surface of the conductive body, and a roughness of the surface of the conductive body being Ra≤1.6 μm.

In some embodiments, a material of the conductive body is an aluminum alloy, and the aluminum alloy includes components of the following mass percentage: 0.02% to 0.85% of Mg, 0.01% to 0.41% of Si, 0.01% to 0.04% of B, 0.01% to 0.062% of Fe, 0 to 0.096% of Zn, 0 to 0.0096% of Ti, 0 to 0.1% of Ni, 98.52% to 99.95% of Al, and impurities, where content of the impurities is ≤0.1%.

In some embodiments, a Vickers hardness of the surface of the conductive body is HV>38.

In some embodiments, the conductive bar further includes a backing layer, the backing layer covering the surface of the conductive body, and the abrasion-resistant layer being arranged on a surface of the backing layer away from the conductive body.

In some embodiments, the conductive bar further includes an insulating layer, and the insulating layer being arranged on a surface of the abrasion-resistant layer away from the conductive body.

In some embodiments, the conductive bar has a yield strength≥75 Mpa, a tensile strength≥114 Mpa, and an electrical conductivity≥57% IACS.

In some embodiments, the conductive bar has a thermal conductivity coefficient ranging from 200 W/m·K to 230 W/m·K.

The present disclosure further provides a conductive bar assembly, including a connecting substrate and multiple foregoing conductive bars. The multiple conductive bars are all mounted on the connecting substrate and are spaced away from each other.

The multiple conductive bars form multiple conductive bar groups. Each conductive bar group includes multiple conductive bars. The multiple conductive bars of each conductive bar group are parallel to each other.

The present disclosure further provides a vehicle electrical device system, including two electrical devices and the foregoing conductive bar. The conductive bar is electrically connected between the two electrical devices.

In the present disclosure, it is found out through a large amount of experimental research that a conductive bar satisfying the expression $\sqrt{\lambda\omega^3/E} \leq \delta \leq 10\sqrt{\lambda\omega^3/E}$ has a small stress, and can satisfy long-term vibratory working conditions with a broadband frequency ranging from 10 Hz to 1000 Hz and a vibration speed effective value (root mean square, RMS) being greater than 27.8 $m/s^2$, avoids fractures in the conductive bar due to vibration during work, and resolves the problem of stress concentration in the conductive bar during long-term use, thereby ensuring that a conductive bar assembly is formed by the conductive bars, and ensuring that the vehicle achieves high mileage under actual road conditions.

BRIEF DESCRIPTION OF THE DRAWINGS

To describe the technical solutions in the embodiments of the present disclosure or in the related art more clearly, the following briefly introduces the accompanying drawings required for describing the embodiments or the related art. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are only some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
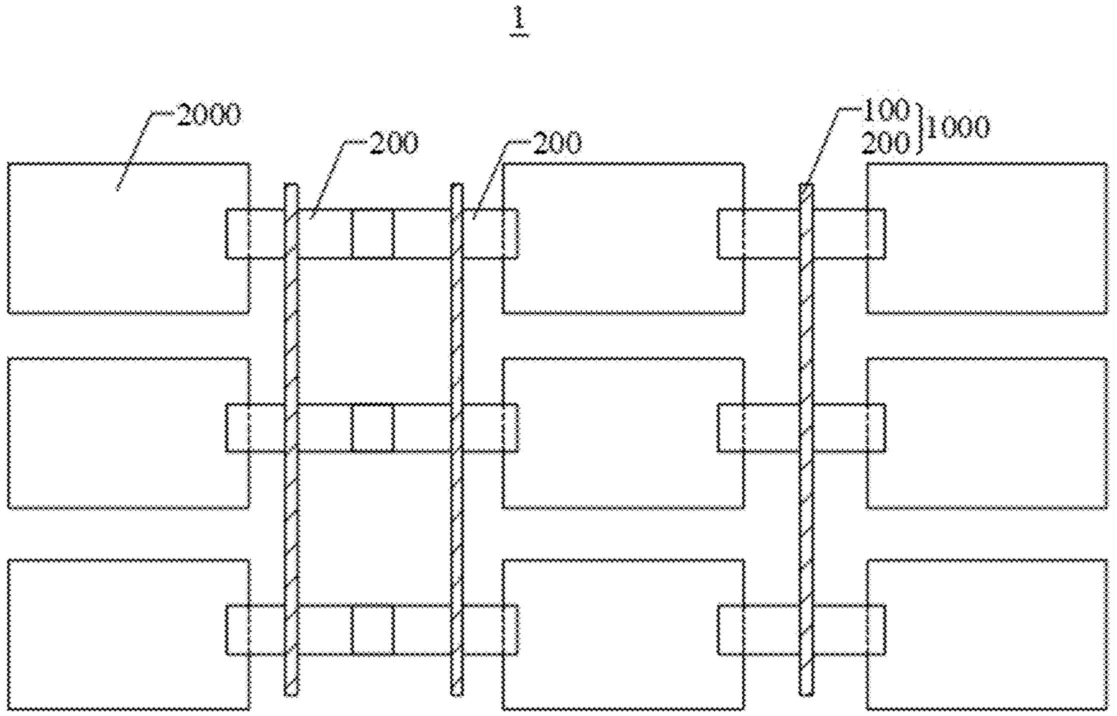
FIG. 1 is a schematic structural arrangement diagram of a vehicle electrical device system according to an embodiment of the present disclosure.

FIG. 1 is a schematic structural arrangement diagram of a vehicle electrical device system 1 according to an embodiment of the present disclosure.

The vehicle electrical device system 1 can be used in a vehicle, and includes a conductive bar assembly 1000 and multiple electrical devices 2000. The multiple electrical devices 2000 may be electrically connected by the conductive bar assembly 1000. For example, the electrical device 2000 may be a battery, a transformer, a motor, a circuit breaker, an alternating-current/direct-current system, a breaker cabinet, a capacitor, or another device.

Specifically, the conductive bar assembly 1000 includes a connecting substrate 100 and multiple conductive bars 200. The connecting substrate 100 is an insulating substrate. The multiple conductive bars 200 are all mounted on the connecting substrate 100 and are spaced away from each other. In this embodiment, the connecting substrate 100 is an integral structure. FIG. 1 only shows a partial structure of the connecting substrate 100. It can be understood that, in other embodiments, the connecting substrate 100 may be multiple separate structures. The multiple conductive bars 200 form multiple conductive bar groups, and as shown in the figure, form three vertical rows. Each conductive bar group includes multiple conductive bars 200. The multiple conductive bars 200 of each conductive bar group are parallel to each other. Conductive bars 200 in different conductive bar groups are electrically connected, to implement electrical connections between the different conductive bar groups.

The multiple electrical devices 2000 may be electrically connected by the multiple conductive bars 200, to implement electrical connections between the multiple electrical devices 2000. As shown in the figure, the electrical devices 2000 in each horizontal row are electrically connected by the conductive bars 200, to implement electrical connections between the electrical devices 2000. The multiple electrical devices 2000 may be electrically connected by the conductive bar assembly 1000, and through the electrical connections to different conductive bar groups, the three-dimensional layout of the electrical devices 2000 in space is implemented.

Figure 2:
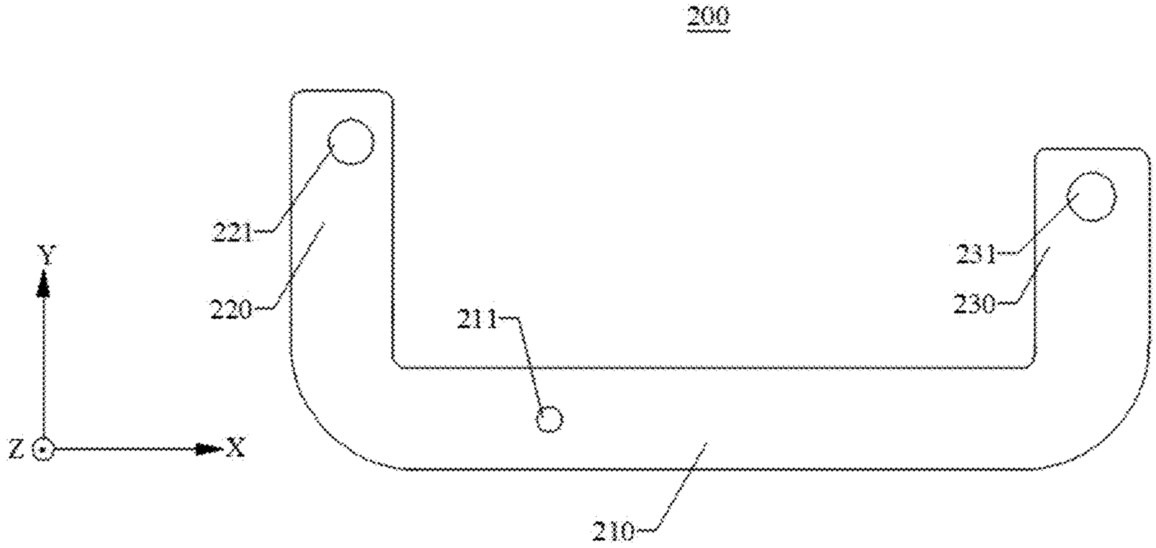
FIG. 2 is a schematic structural diagram of a conductive bar according to a first embodiment of the present disclosure.

FIG. 2 is a schematic structural diagram of a conductive bar 200 according to a first embodiment of the present disclosure. For example, the conductive bar 200 may be used in the vehicle electrical device system 1 shown in FIG. 1.

For ease of description, it is defined that a length direction of the conductive bar 200 shown in FIG. 2 is an X axis direction, a width direction is a Y axis direction, and a thickness direction is a Z axis direction. The X axis direction, the Z axis direction, and the Y axis direction are perpendicular to each other.

The conductive bar 200 includes at least one connecting section. In this embodiment, the conductive bar 200 has a planar plate shape. Three connecting sections are provided, and include a first connecting section 210, a second connecting section 220, and a third connecting section 230. An extending direction of the first connecting section 210 is parallel to a first direction. Extending directions of the second connecting section 220 and the third connecting section 230 are parallel to a second direction, and are arranged spaced away at two opposite ends of the first connecting section 210. In this embodiment, the first direction is the X axis direction, the second direction is the Y axis direction, and the second direction is perpendicular to the thickness direction of the first connecting section 210.

The first connecting section 210 has a width ω and a thickness δ. In some specific embodiments, the width ω is in a range of 10 mm to 30 mm, and the thickness δ is in a range of 1 mm to 10 mm. A fixing hole 211 is provided in the first connecting section 210. The fixing hole 211 penetrates the first connecting section 210 along the thickness direction of the first connecting section 210. A bolt or another fastener may pass through the fixing hole 211 and a through hole in the connecting substrate 100 to fix the first connecting section 210 at the connecting substrate 100, to implement a fixed connection between the conductive bar 200 and the connecting substrate 100.

The second connecting section 220 has a width ω and a thickness δ. In some specific embodiments, the width ω is in a range of 10 mm to 30 mm, and the thickness δ is in a range of 1 mm to 10 mm. A first connecting hole 221 is provided in the second connecting section 220. The first connecting hole 221 penetrates the second connecting section 220 along a thickness direction of the second connecting section 220.

The third connecting section 230 has a width ω and a thickness δ. In some specific embodiments, the width ω is in a range of 10 mm to 30 mm, and the thickness δ is in a range of 1 mm to 10 mm. A second connecting hole 231 is provided in the third connecting section 230. The second connecting hole 231 penetrates the third connecting section 230 along a thickness direction of the third connecting section 230. A bolt or another fastener may pass through the first connecting hole 221 to electrically connect the second connecting section 220 to one electrical device 2000, and pass through the second connecting hole 231 to electrically connect the third connecting section 230 to another electrical device 2000, so as to implement electrical connections between one conductive bar 200 and the two electrical devices 2000. The first connecting hole 221 and the second connecting hole 231 are disposed, so that it can be implemented that the conductive bar 200 is fixedly connected to the electrical device 2000 by a bolt or another fastener, which facilitates after sales service and repair, and also resolves the problem of inconvenience in assembly and disassembly because welding needs to be used for connection in an existing conductive bar 200.

It can be understood that, a bolt or another fastener may pass through the first connecting hole 221 of one conductive bar 200 and the second connecting hole 231 of another conductive bar 200, to fixedly connect the two conductive bars 200, so as to implement electrical connections between two electrical devices 2000 by the two conductive bars 200.

Figure 3:
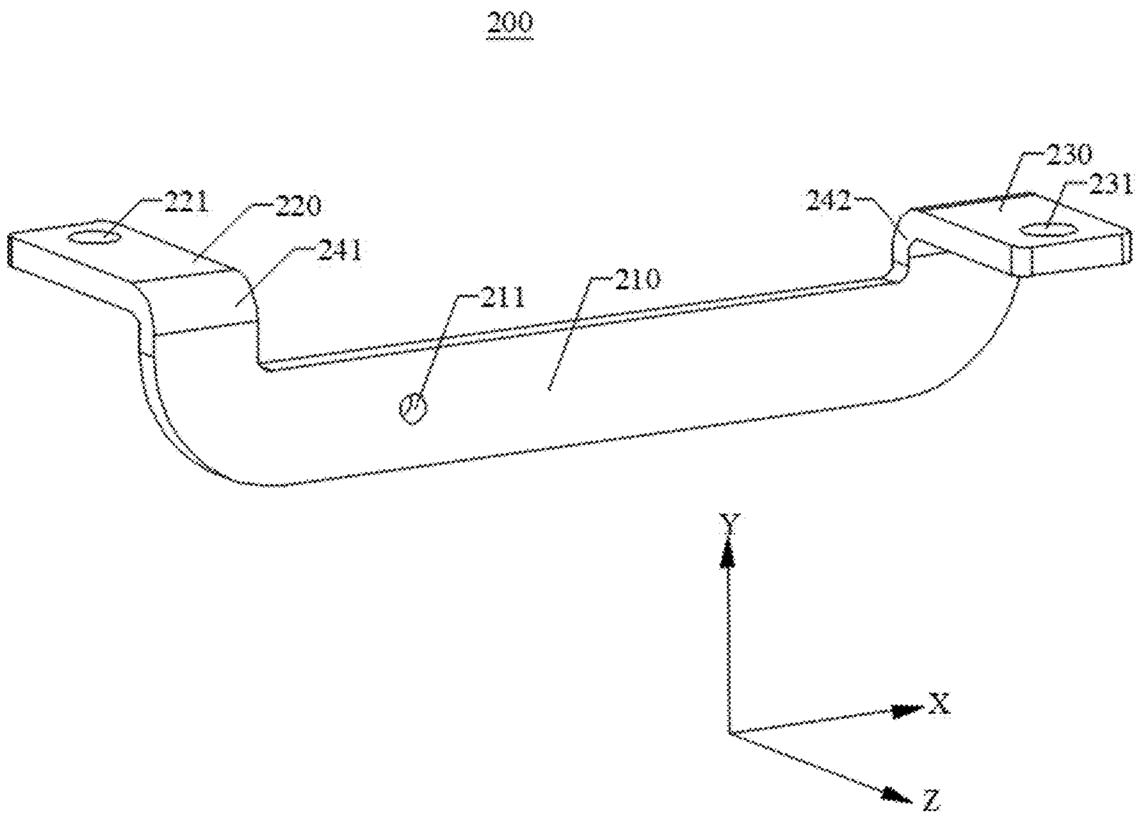
FIG. 3 is a schematic structural diagram of a conductive bar according to a second embodiment of the present disclosure.
Figure 4:
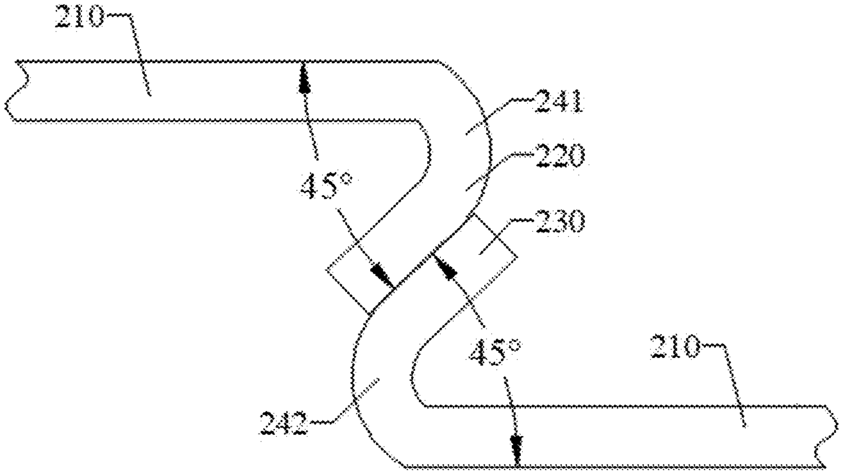
FIG. 4 is a schematic structural diagram of two conductive bars with bending radians of 45° being connected.
Figure 5:
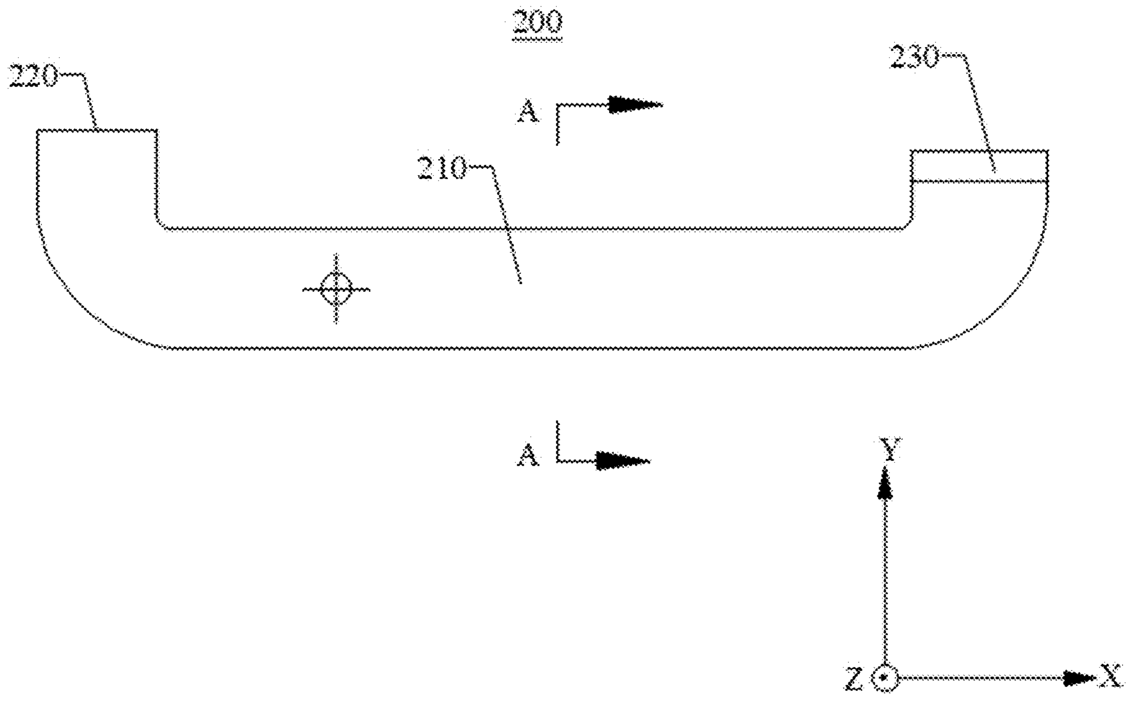
FIG. 5 is a schematic structural diagram of the conductive bar shown in FIG. 3 from another angle of view.
Figure 6:
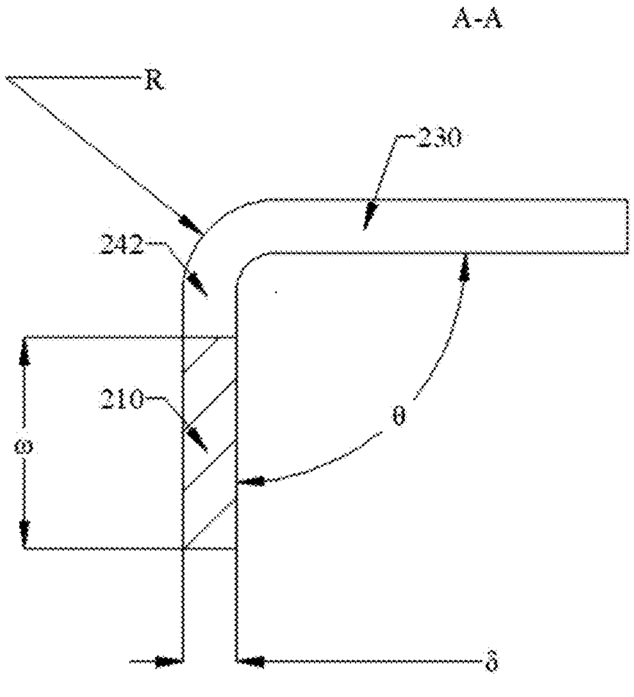
FIG. 6 is a schematic cross-sectional view of the conductive bar shown in FIG. 5 along A-A.

FIG. 3 is a schematic structural diagram of a conductive bar 200 according to a second embodiment of the present disclosure. FIG. 4 is a schematic structural diagram of two conductive bars 200 with bending radians of 45° being connected. FIG. 5 is a schematic structural diagram of the conductive bar 200 shown in FIG. 3 from another angle of view. FIG. 6 is a schematic cross-sectional view of the conductive bar 200 shown in FIG. 5 along A-A. For example, the conductive bar 200 may be used in the vehicle electrical device system 1 shown in FIG. 1.

As shown in FIG. 3, the conductive bar 200 in this embodiment has a three-dimensional structure, and a difference from the conductive bar 200 in the first embodiment lies in that the conductive bar 200 in this embodiment further includes a first transition section 241 and a second transition section 242. Specifically, in this embodiment, the conductive bar 200 in this embodiment includes the first connecting section 210, the second connecting section 220, the first transition section 241, the second transition section 242, and the third connecting section 230. The first transition section 241 is connected between the first connecting section 210 and the second connecting section 220, to enable the first connecting section 210 and the second connecting section 220 to be located in different planes. The second transition section 242 is connected between the first connecting section 210 and the third connecting section 230, to enable the first connecting section 210 and the third connecting section 230 to be located in different planes.

In this embodiment, the first connecting section 210, the second connecting section 220, and the third connecting section 230 all have a strip shape. The first connecting section 210 extends in the X axis direction, the second connecting section 220 extends in the negative Z axis direction, and the third connecting section 230 extends in the positive Z axis direction. The first connecting section 210 has a width ω and a thickness δ. In some specific embodiments, the width ω is in a range of 10 mm to 30 mm, and the thickness δ is in a range of 1 mm to 10 mm. In this embodiment, the first transition section 241 is an arc-shaped surface and has a bending radius R and a bending radian θ. A cross-sectional shape of the arc-shaped surface is a arc, the bending radius R is a radius corresponding to the arc, and the bending radian is a curvature corresponding to the arc. In some specific embodiments, the bending radius R of the first transition section 241 is in a range of 2 mm to 20 mm. A large bending radius R is used as a transition radius, so that stress concentration can be effectively reduced, thereby effectively improving the fatigue strength of the conductive bar 200. The bending radian θ of the first transition section 241 is 90°, to enable an included angle between the extending direction of the second connecting section 220 and the extending direction of the first connecting section 210 to be 90°. To be specific, the second connecting section 220 extends in the negative Z axis direction, and is parallel to the thickness direction of the first connecting section 210. In other embodiments, the bending radian θ of the first transition section 241 may range from 45° to 135°, to implement that the included angle between the extending direction of the second connecting section 220 and the extending direction of the first connecting section 210 ranges from 45° to 135°.

In this embodiment, the second transition section 242 is an arc-shaped surface and has a bending radius R and a bending radian θ. In some specific embodiments, the bending radius R of the second transition section 242 is in a range of 2 mm to 20 mm, so that stress concentration is reduced, thereby effectively improving the fatigue strength of the conductive bar 200. The bending radian θ of the second transition section 242 is 90° and is in a direction opposite to a bending direction of the first transition section 241, to make the extending directions of the second connecting section 220 and the third connecting section 230 opposite. To be specific, the third connecting section 230 extends in the positive Z axis direction, and is parallel to the thickness direction of the first connecting section 210. In other embodiments, the bending radian θ of the second transition section 242 may range from 45° to 135°, to implement that an included angle between the extending direction of the third connecting section 230 and the extending direction of the first connecting section 210 ranges from 45° to 135°. In some specific embodiments, as shown in FIG. 4, the bending radians θ of the first transition section 241 and the second transition section 242 of the conductive bar 200 are 45°, and the second connecting section 220 of one conductive bar 200 and the third connecting section 230 of another conductive bar 200 can be connected by a bolt or another fastener, to implement a fixed connection between the two conductive bars 200.

The conductive bar 200 in this embodiment may be made by bending the conductive bar 200 in the first embodiment. Specifically, the second connecting section 220 of the conductive bar 200 in the first embodiment bends in the negative Z axis direction, and the third connecting section 230 bends in the positive Z axis direction, to manufacture and form the conductive bar 200 in the second embodiment. In other embodiments, the conductive bar 200 in this embodiment may be integrally formed.

Figure 7:
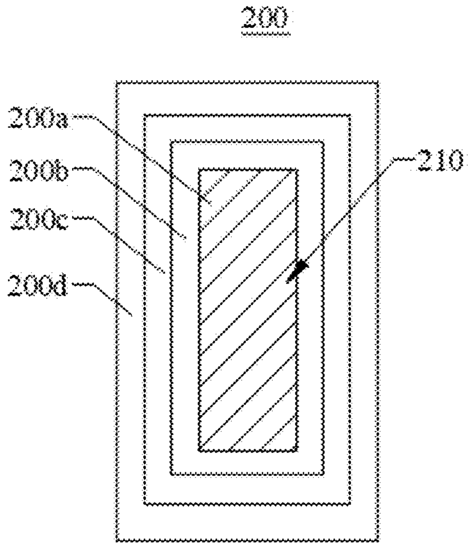
FIG. 7 is a structural cross-sectional view of the conductive bar shown in FIG. 5 at a first connecting section.
Figure 8:
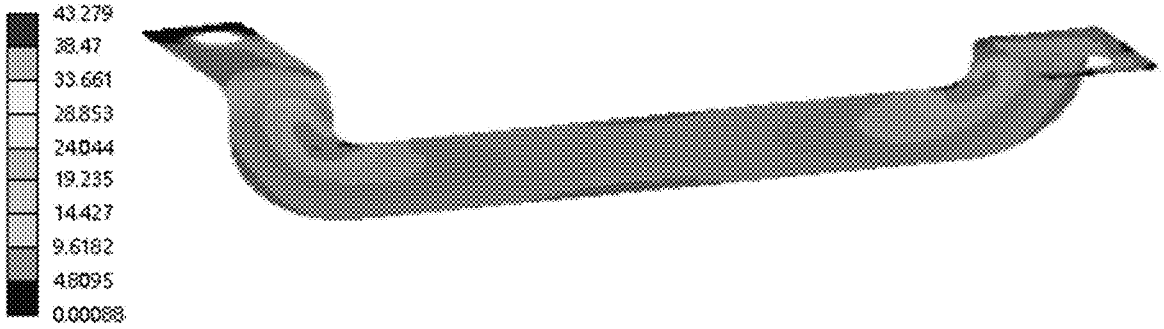
FIG. 8 is a stress cloud diagram of a conductive bar in Experimental group 1.
Figure 9:
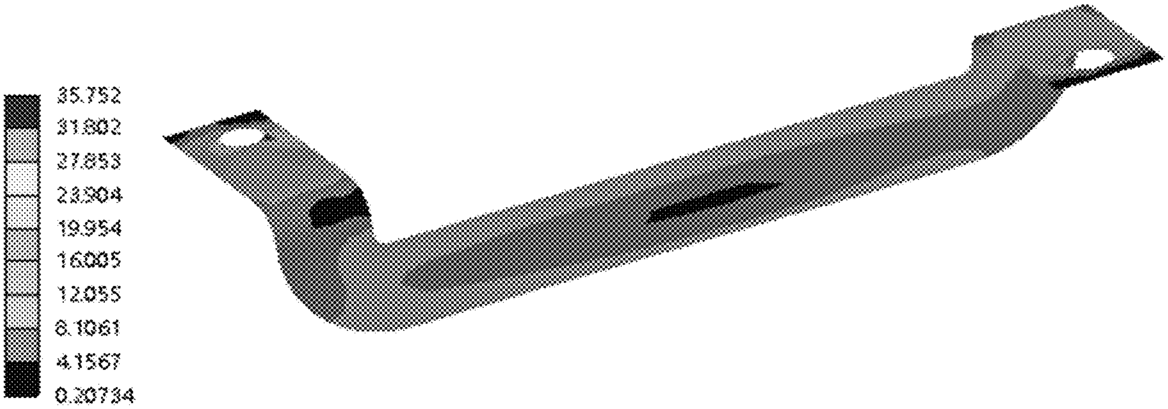
FIG. 9 is a stress cloud diagram of a conductive bar in Experimental group 2.
Figure 10:
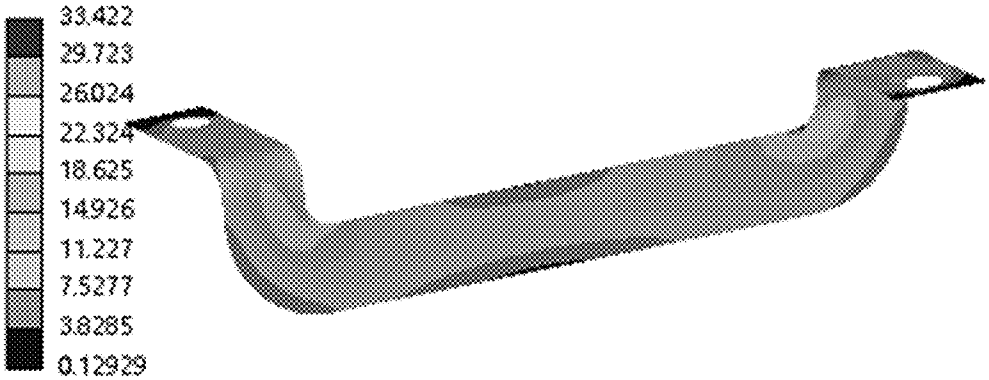
FIG. 10 is a stress cloud diagram of a conductive bar in Experimental group 3.
Figure 11:
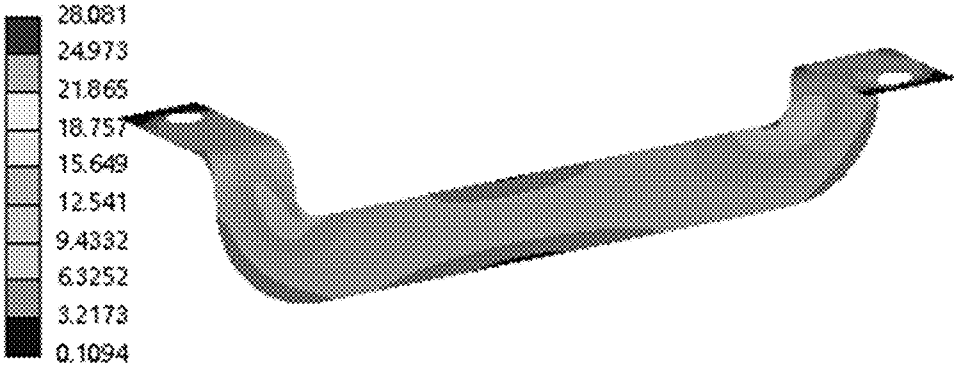
FIG. 11 is a stress cloud diagram of a conductive bar in Experimental group 4.
Figure 12:
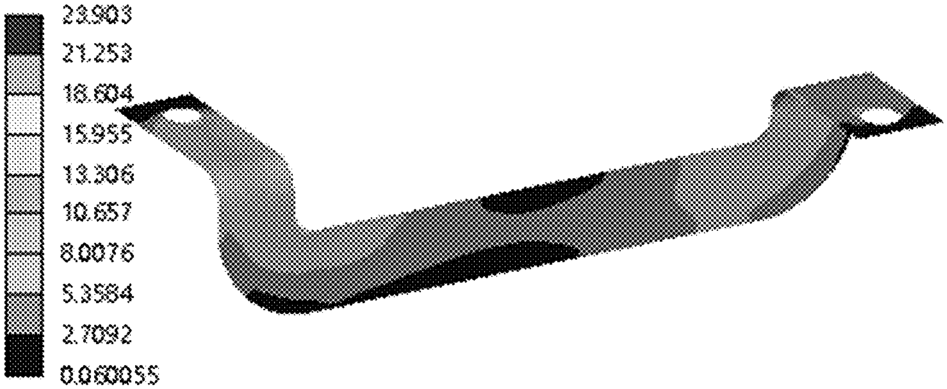
FIG. 12 is a stress cloud diagram of a conductive bar in Experimental group 5.
Figure 13:
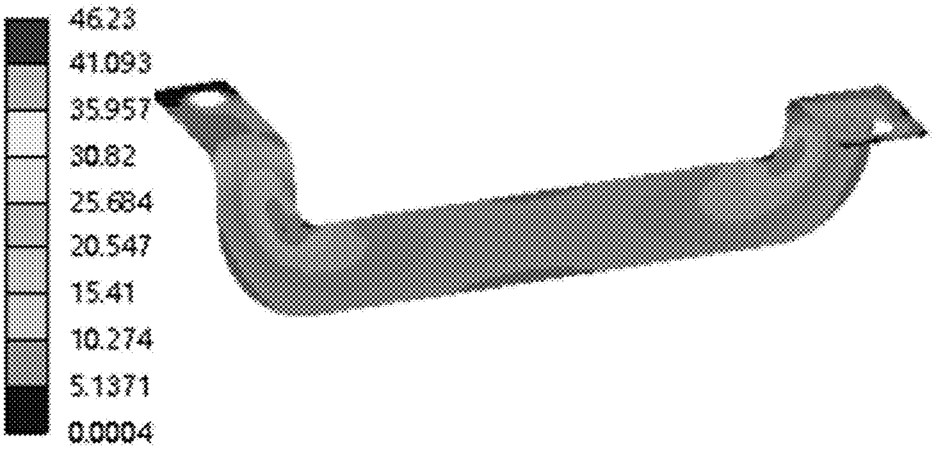
FIG. 13 is a stress cloud diagram of a conductive bar in Experimental group 6.
Figure 14:
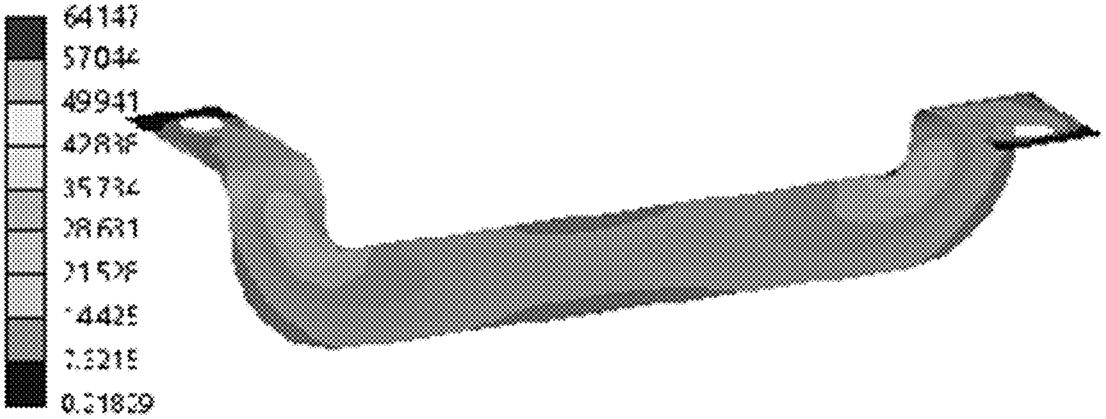
FIG. 14 is a stress cloud diagram of a conductive bar in Experimental group 7.
Figure 15:
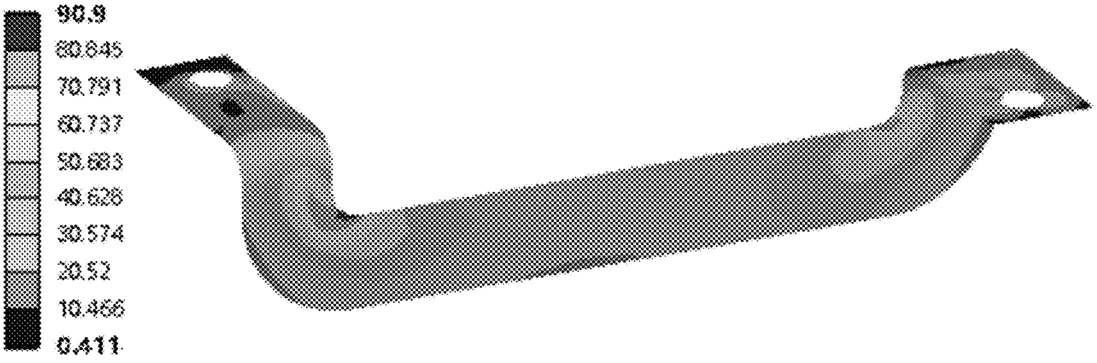
FIG. 15 is a stress cloud diagram of a conductive bar in Experimental group 8.
Figure 16:
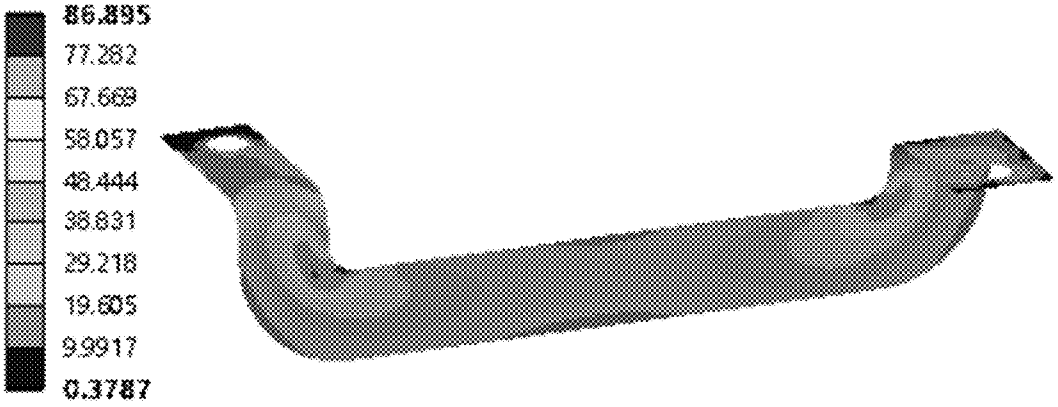
FIG. 16 is a stress cloud diagram of a conductive bar in Experimental group 9.
Figure 17:
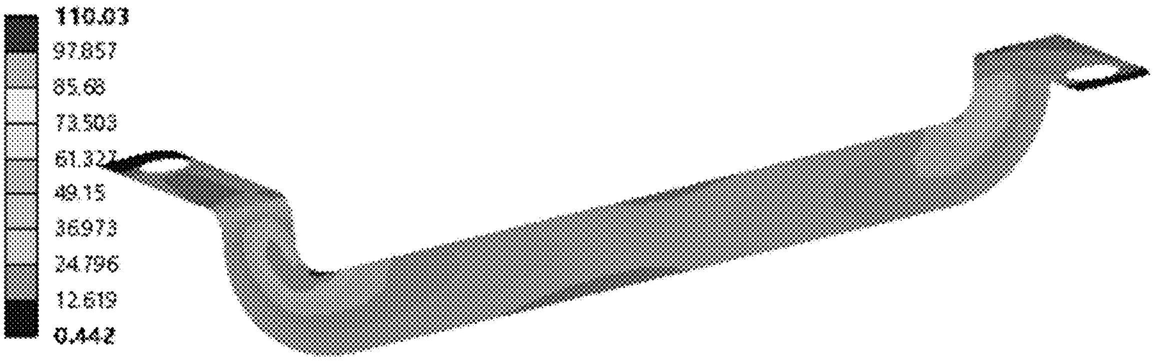
FIG. 17 is a stress cloud diagram of a conductive bar in Experimental group 10.
Figure 18:
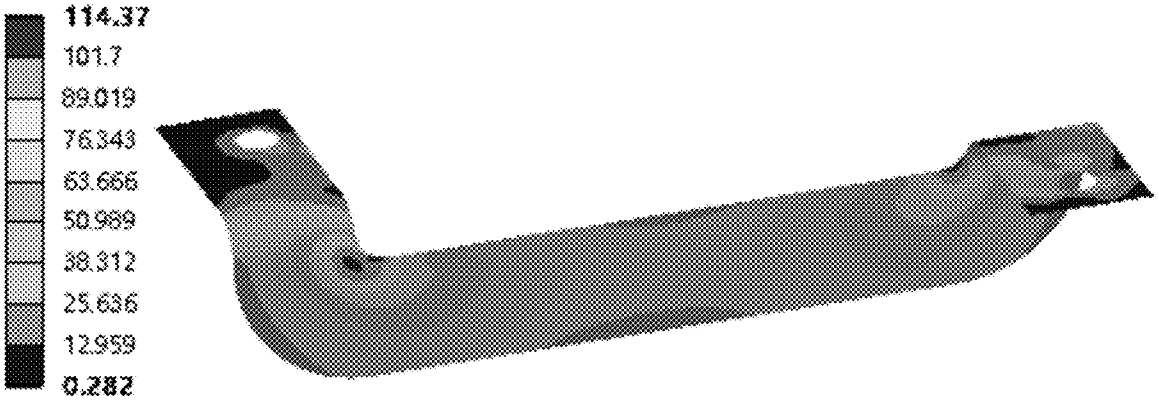
FIG. 18 is a stress cloud diagram of a conductive bar in Experimental group 11.
Figure 19:
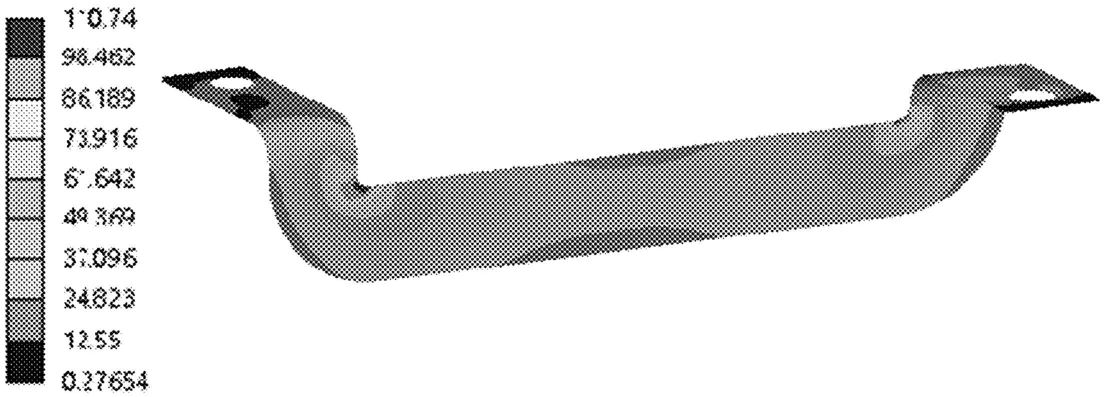
FIG. 19 is a stress cloud diagram of a conductive bar in Experimental group 12.

FIG. 7 is a structural cross-sectional view of the conductive bar 200 shown in FIG. 5 at the first connecting section 210.

The conductive bar 200 includes a conductive body 200*a*, a backing layer 200*b*, an abrasion-resistant layer 200*c*, and an insulating layer 200*d*. The backing layer 200*b* covers a surface of the conductive body 200*a*, the abrasion-resistant layer 200*c* is arranged on a surface of the backing layer 200*b* away from the conductive body 200*a*, the insulating layer 200*d* is arranged on a surface of the abrasion-resistant layer 200*c* away from the conductive body 200*a*, and the insulating layer 200*d* covers a part of the conductive body 200*a* located at the first connecting section 210. It can be understood that, in the conductive bar 200 in this embodiment, the insulating layer 200*d* may cover parts of the conductive body 200*a* located at the first transition section 241 and the second transition section 242. The insulating layer 200*d* does not cover parts of the conductive body 200*a* located at the second connecting section 220 and the third connecting section 230, to ensure that the second connecting section 220 and the third connecting section 230 can be electrically connected to the electrical device 2000.

In the conductive bar 200 in this embodiment, the three-dimensional structure shown in FIG. 3 is formed by bending the conductive body 200*a*, then the conductive body 200*a* is sequentially electroplated to form the backing layer 200*b* and the abrasion-resistant layer 200*c*, and then the insulating layer 200*d* covers parts of the abrasion-resistant layer 200*c* located at the first connecting section 210, the first transition section 241, and the second transition section 242, to manufacture and form the conductive bar 200.

The conductive body 200*a* is made of a conductive material, for example, made of an aluminum alloy. In some specific embodiments, a roughness of the surface of the conductive body 200*a* is controlled to be Ra≤1.6 μm, so that the fatigue strength of the conductive bar 200 can be improved, thereby avoiding the problem of damaged fatigue strength at stress concentration of the conductive bar 200 because stress concentration is generated at a sudden change of a cross-sectional size of the conductive bar 200. In addition, surface strengthening, for example, shot blasting, is performed on the conductive body 200*a*, so that a compressive prestress is generated on the surface of the conductive body 200*a*, thereby improving the fatigue resistance of the conductive bar 200. In some specific embodiments, shot blasting is performed on the conductive body 200*a*, to make the Vickers hardness of the surface of the conductive body 200*a* HV>38, to resist the impact generated from fatigue.

In some embodiment, the conductive body 200*a* is sequentially plated with copper and nickel in an electroplating manner, to respectively form the backing layer 200*b* and the abrasion-resistant layer 200*c*. In an electroplating process, copper ions in a positive valence state are reduced to metal atoms, are attracted to the surface of the conductive body 200*a*, and migrate on the surface of the conductive body 200*a* until being incorporated into a crystal lattice to form the backing layer 200*b*. The electroplating process is performed under the "driving" with a difference between a reaction potential and an equilibrium potential, so that the backing layer 200*b* is compact and flat and has good bonding strength with the conductive body 200*a*, to ensure the adhesion of the subsequent abrasion-resistant layer 200*c*, thereby keeping the abrasion-resistant layer 200*c* from falling off. In this embodiment, the abrasion-resistant layer 200*c* is a nickel layer, and the abrasion-resistant layer 200*c* has a thickness of 10 μm and a peel strength up to 35 N/mm. The nickel layer is arranged, so that an abrasion-resistant surface layer is obtained while an excellent electrical conductivity is ensured, thereby improving the strength of the conductive bar 200.

In this embodiment, the insulating layer 200*d* is manufactured on the abrasion-resistant layer 200*c* in a spray coating manner. The insulating layer 200*d* is made of an epoxy resin layer, and has a thickness ranging from 0.3 mm to 0.9 mm. The insulating layer 200*d* is arranged, so that a creepage distance and an electrical clearance of the conductive bar 200 can be increased, so as to ensure that the conductive bar 200 has a voltage resistance of 3000 V (AC), a 60-second leakage current less than 3 mA, an insulating resistance of 1000 V (DC), and a 60-second leakage insulating resistance greater than 200 mΩ. In some embodiments, a sprayed code is manufactured on the insulating layer 200*d*, thereby improving the recognition and storage functions.

The conductive bar 200 provided in the embodiments of the present disclosure has a good electrical conductivity and mechanical properties, so that the problem of stress concentration generated in long-term use under vibratory road conditions, and fractures in the conductive bar 200 due to vibration during work are avoided, thereby ensuring that the conductive bar assembly 1000 formed by using the conductive bar 200 is reliable and durable, and ensuring that a vehicle has high mileage under actual road conditions.

1.1 Selection of Impact Factors Related to a Stress of a Conductive Bar

Numerous factors are related to the stress performance of the conductive bar 200. The conductive bar 200 having the three-dimensional structure shown in FIG. 3 in the embodiments of the present disclosure is used as an experimental object for a simulation test to acquire a stress cloud diagram of the conductive bar 200. In addition, a large number of tests and experiments are carried out, and relationships between a maximum stress of the conductive bar 200 and impact factors such as an expansion coefficient, an aging temperature, an aging time, and an elastic modulus E are specifically researched. Some experimental results are collected as shown in Table 1 to Table 4. A material of the conductive bar 200 is an aluminum alloy. The aluminum alloy is manufactured in the following manner: taking raw material components of the aluminum alloy, and performing solution treatment and aging treatment to obtain the aluminum alloy. A specific testing method of the simulation test is as follows: Parameters of the conductive bar 200 and parameters of a vibration experiment are imported into a finite element analysis element to perform a simulation experiment on the conductive bar 200. The parameters of the vibration experiment include: a working condition of a vibration time of 22 h, a broadband frequency ranging from 10 Hz to 1000 Hz, a power density in a range of [0.2 $(m/s^2)^2$/HZ, 30 $[(m/s^2)^2$/HZ], a vibration condition root mean square (RMS, a vibration speed effective value) of 27.8 $m/s^2$. It is required that no mechanical damage and loosening should exist after the experiment.

TABLE 1

Relationship between an expansion coefficient factor and a maximum stress of a conductive bar

| Sample number | Width ω/mm | Thickness δ/mm | Expansion coefficient μm/m · ° C. | Maximum stress (MPa) |
|---|---|---|---|---|
| Z210031a | 16 | 2 | 17.5 | 92.4 |
| Z210031b | | | 23.6 | 92.4 |
| Z210031c | | | 28.2 | 92.3 |

TABLE 2

Relationship between an aging temperature factor and a maximum stress of a conductive bar

| Sample number | Width ω/mm | Thickness δ/mm | Temperature ° C. of aging treatment | Maximum stress (MPa) |
|---|---|---|---|---|
| Z210032a | 16 | 2 | 160 | 92.4 |
| Z210032b | | | 170 | 92.4 |
| Z210032c | | | 180 | 92.4 |

TABLE 3

Relationship between an aging time factor and a maximum stress of a conductive bar

| Sample number | Width ω/mm | Thickness δ/mm | Time h of aging treatment | Maximum stress (MPa) |
|---|---|---|---|---|
| Z210033a | 16 | 2 | 8 | 92.4 |
| Z210033b | | | 10 | 92.5 |
| Z210033c | | | 12 | 92.4 |

TABLE 4

Relationship between an elastic modulus factor and a maximum stress of a conductive bar

| Sample number | Width ω/mm | Thickness δ/mm | Elastic modulus E/Gpa | Maximum stress (MPa) |
|---|---|---|---|---|
| Z210034a | 16 | 2 | 35 | 114.4 |
| Z210034b | | | 74 | 90.9 |
| Z210034c | | | 69.9 | 92.4 |

It can be seen from Table 1 to Table 4, none of the expansion coefficient factor, the aging temperature factor, and the aging time factor significantly affects the stress of the conductive bar 200, and the elastic modulus factor significantly affects the stress of the conductive bar 200. In the present disclosure, the research of a large number of experiments is carried out, and an elastic modulus is selected from numerous impact factors as a key factor that affects the stress of the conductive bar 200. A conductive bar 200 that has a small stress and can work for a long time at a broadband frequency ranging from 10 Hz to 1000 Hz under a vibration case of a vibration speed effective value (root mean square, RMS) being greater than 27.8 $m/s^2$ can be designed by adjusting the elastic modulus, the width, and the thickness of the conductive bar 200.

1.2 Optimization of Expressions of the Elastic Modulus E, the Width, and the Thickness of the Conductive Bar An aluminum alloy material is used to make the conductive bar 200 in the following experiments, and relationships between the stress of the conductive bar 200 and the width ω, the thickness δ, and the elastic modulus E of the conductive bar 200 are specifically researched. Specifically, a method of design of experiments (DOE) single-factor adjustment is used in the embodiments of the present disclosure, multiple groups of conductive bars 200 having different widths ω, thicknesses δ, and elastic moduli E are designed, and a simulation test is performed on the conductive bars 200 to measure stresses of conductive bars 200 in different groups. Stress cloud diagrams of the stress cloud diagram 200 in Experimental groups 1 to 12 are shown in FIG. 8 to FIG. 19. Parameters of the conductive bars 200 and measured maximum stresses are collected as shown in Table 5. The conductive bars 200 in Experimental groups 1 to 6 are respectively conductive bars manufactured and formed by using the aluminum alloys provided in Embodiments 1 to 6 in Table 7 below. The conductive bar 200 in Experimental group 7 is a conductive bar manufactured and formed by using the aluminum alloy provided in Embodiment 11 in Table 7 below. The conductive bars 200 in Experimental groups 8 and 9 are respectively conductive bars manufactured and formed by using the aluminum alloys provided in Embodiments 7 and 8 in Table 7 below. The conductive bars 200 in Experimental groups 10 to 12 are conductive bars manufactured and formed by using the aluminum alloy provided in Contrast example 1 in Table 7 below.

TABLE 5

Parameters of the conductive bars 200 in different groups and measured maximum stresses

| Experimental group | Width ω/mm | Thickness δ/mm | Elastic modulus E/Gpa | Maximum stress (MPa) |
|---|---|---|---|---|
| 1 | 16 | 4 | 74.0 | 43.279 |
| 2 | 16 | 5 | 72.0 | 35.752 |
| 3 | 16 | 8 | 69.9 | 33.422 |
| 4 | 16 | 11 | 69.9 | 28.081 |
| 5 | 16 | 20 | 69.9 | 23.903 |
| 6 | 20 | 5 | 72.0 | 46.230 |
| 7 | 16 | 4 | 58 | 64.100 |
| 8 | 16 | 2 | 74 | 90.900 |
| 9 | 20 | 3 | 69.9 | 86.895 |
| 10 | 16 | 2 | 35 | 110.030 |
| 11 | 10 | 60 | 35 | 114.370 |
| 12 | 11 | 2 | 35 | 110.740 |

In the embodiments of the present disclosure, when it is optimized by fitting a large amount of experimental data that the range of the thickness δ satisfies the following feature expression (i): $\sqrt{\lambda\omega^3/E}\leq\delta\leq 10\sqrt{\lambda\omega^3/E}$ (i), and the elastic modulus E is in the range of 55 Gpa to 120 Gpa, the maximum stress of the conductive bar 200 is small, a good strength effect is achieved, and long-term vibratory working conditions with a broadband frequency ranging from 10 Hz to 1000 Hz and a vibration speed effective value (root mean square, RMS) being greater than 27.8 $m/s^2$ can be satisfied, so that fractures in the conductive bar 200 due to vibration during work are avoided.

It can be seen from data in some experimental groups shown in Table 5 that for the conductive bars 200 in Experimental groups 1 to 7, when the thicknesses δ satisfy the foregoing feature expression (i) and the elastic moduli E satisfy the range of 55 Gpa to 120 Gpa, the measured stresses of the conductive bars 200 are small, and long-term vibratory working conditions can be satisfied. In addition, the thicknesses δ of the conductive bars 200 in Experimental groups 1 to 7 further satisfy the expressions: $\sqrt{\lambda\omega^3/E}\leq\delta\leq 2\sqrt{\lambda\omega^3/E}$, $\sqrt{\lambda\omega^3/E}\leq\delta\leq 3\sqrt{\lambda\omega^3/E}$, $\sqrt{\lambda\omega^3/E}\leq\delta\leq 4\sqrt{\lambda\omega^3/E}$, $\sqrt{\lambda\omega^3/E}\leq\delta\leq 5\sqrt{\lambda\omega^3/E}$, or $\sqrt{\lambda\omega^3/E}\leq\delta\leq 6\sqrt{\lambda\omega^3/E}$.

As can be learned by comparing Experimental groups 8 to 12 and Experimental groups 1 to 7, for the conductive bars 200 in Experimental groups 8 and 9, although the elastic moduli E satisfy the range of 55 Gpa to 120 Gpa, but the thicknesses δ do not satisfy the feature expression (i). The measured stresses of the conductive bars 200 are very large, and cannot satisfy long-term vibratory working conditions. For the conductive bars 200 in Experimental groups 10 and 11, the elastic moduli E are all less than 55 Gpa, and the thicknesses δ do not satisfy the feature expression (i). The maximum stress of the conductive bar 200 cannot be effectively reduced by adjusting the width ω or the thickness δ, and long-term vibratory working conditions cannot be satisfied. For the conductive bar 200 in Experimental group 12, the thickness δ satisfies the feature expression (i), but the elastic modulus E does not satisfy the range of 55 Gpa to 120 Gpa, the measured stress of the conductive bars 200 is small, and long-term vibratory working conditions cannot be satisfied. Experimental results show that only a conductive bar 200 that satisfies both the range of the thickness δ being $\sqrt{\lambda\omega^3/E}\leq\delta\leq 10\sqrt{\lambda\omega^3/E}$ and the range of the elastic modulus E being 55 Gpa to 120 Gpa has a small stress and can satisfy long-term vibratory working conditions, thereby avoiding fractures in the conductive bar 200 due to vibration during work.

The conductive bar 200 in Experimental group 1 is taken. A bolt fastener (marked as a hole 1-bolt) passes through the first connecting hole 221, a bolt fastener (marked as a hole 2-bolt) passes through the second connecting hole 231, to fix the conductive bar 200 at a vibrating table, and then a vibration experiment is performed on the conductive bar 200. The conditions of the vibration experiment are: a broadband frequency ranging from 10 Hz to 1000 Hz, a power density in a range of [0.2 $(m/s^2)^2$/HZ, 30 [$(m/s^2)^2$/HZ], a vibration condition RMS of 27.8 $m/s^2$, and a vibration time of 22 h. Torque values of the bolt fasteners in the conductive bar 200 before the vibration experiment and after the vibration experiment are measured, and results are collected as shown in Table 6. A method for measuring a torque value of a bolt fastener is measured: 1. A torque of the bolt fastener before the vibration experiment is tested by using a tightening method, a force is stably applied by using a wrest wrench, and a moment is gradually increased. When the bolt starts to generate a slight rotation, an instantaneous torque value of the bolt is maximum (because a force of static friction needs to be overcome). As the rotation continues, the torque value falls back to a temporary stable state. In this case, the torque value is a detected torque value. 2. A torque of the bolt fastener after the vibration experiment is tested by using a loosening method. A torque is slowly applied to the bolt under test by using a wrest wrench to loosen the bolt. An instantaneous torque value when the rotation starts is read, and is multiplied by a coefficient ranging from 1.1 to 1.2 according to experiments and experience to obtain a detected torque value.

TABLE 6

Torque values of the conductive bar 200 before the vibration experiment and after the vibration experiment

| Sequence No. | Test item | Test method | Application position | Bolt size | Torque value |
|---|---|---|---|---|---|
| 1 | Torque test (before test) | Tightening method N · m | Hole 1-bolt | M6 | 6.03 |
| | | | Hole 2-bolt | M6 | 6.05 |
| 2 | Torque test (after test) | Loosening method N · m | Hole 1-bolt | M6 | 5.43 |
| | | | Hole 2-bolt | M6 | 5.39 |

A torque attenuation value of the hole 1-bolt fastener is =(6.03−5.43)/6.03×100%=9.95%<20%, and A torque attenuation value of the hole 2-bolt fastener is =(6.05−5.39)/6.05×100%=10.91%<20%. The experimental results show that after bearing the vibration under the road condition of a broadband frequency ranging from 10 Hz to 1000 Hz, a power density in a range of [0.2 $(m/s^2)^2$/HZ, 30 [$(m/s^2)^2$/HZ], and a vibration condition RMS of 27.8 $m/s^2$, the conductive bar 200 provided in the embodiments of the present disclosure can still keep a fastener torque attention <20%, which facilitates long-term use of the conductive bar 200 under actual vibration road conditions.

1.3 Optimization of the Aluminum Alloy Material Used in the Conductive Body 200*a* in a Transfer Busbar Each of Embodiments 1 to 11 and Contrast Example 1 provides a conductive bar 200, which is specifically manufactured by using the following steps: configuring an aluminum alloy raw material according to the components shown in FIG. 7, performing solution treatment at a temperature of 530 °C for 25 min, and then performing aging treatment at a temperature of 195 °C for 33 hours to obtain an aluminum alloy. Next, the aluminum alloy is cut to form a planar plate shape shown in FIG. 2, and is then bent to obtain the conductive body 200*a* having the three-dimensional structure shown in FIG. 3. Grinding, polishing, and electroplating are sequentially performed to form the backing layer 200*b* and the abrasion-resistant layer 200*c*, and spray coating is performed to form the insulating layer 200*d*, to obtain the conductive bar 200. The components of the aluminum alloy in Embodiments 1 to 11 and Contrast example 1 are all calculated in mass percentage, and the balance is Al.

A performance test is performed on the conductive bars 200 manufactured in Embodiments 1 to 11 and Contrast example 1, and performance parameters of the conductive bars are collected as shown in Table 7. The International Annealed Copper Standard (IACS) is used to represent an electrical conductivity of a metal or an alloy (with reference to the standard annealed copper).

fluidity and the mold stickiness. However, if excessive Si and Fe are added, the electrical conductivity is poor, and if insufficient Si and Fe are added, the strength is poor. In addition, Zn and Ni can improve the strength without reducing the electrical conductivity in the aluminum alloy. In the embodiments of the present disclosure, the aluminum alloy material can have both mechanical properties and electrical conductivity by controlling the content of Si to be less than 0.5 wt. %, the content of Fe to be less than 0.1 wt. %, the content of Ni to be less than 0.1 wt. %, and the content of Zn to be less than 0.1 wt. %. In addition, the aluminum alloy material has high strength by controlling the content of impurity elements. After the aluminum alloy materials in Embodiments 1 to 10 of the present disclosure are bent by 90° (1 t), the surfaces of the aluminum alloy materials have no cracks. In addition, through measurement, the aluminum alloy materials in Embodiments 1 to 10 have a yield strength≥75 Mpa, a tensile strength≥114 Mpa, an

TABLE 7

Components of aluminum alloys in Embodiments 1 to 11 and Contrast example 1 and performance parameters of the manufactured conductive bar 200

| | Si | Fe | Ni | Zn | B | Ti | Mg | Al | Yield strength MPa | Tensile strength MPa | Elastic modulus GPa | Electrical conductivity % IACS | Thermal conductivity coefficient W/m · K |
|---|---|---|---|---|---|---|---|---|---|---|---|---|---|
| Embodiment 1 | 0.4 | 0.06 | 0.1 | 0.09 | 0.04 | 0.002 | 0.1 | Balance | 89 | 211 | 74.0 | 57.1 | 210 |
| Embodiment 2 | 0.3 | 0.05 | 0.1 | 0.09 | 0.03 | 0.01 | 0.4 | Balance | 87 | 183 | 72.0 | 57.7 | 216 |
| Embodiment 3 | 0.2 | 0.04 | 0.05 | 0.05 | 0.02 | 0.002 | 0.85 | Balance | 84 | 155 | 69.9 | 58.0 | 218 |
| Embodiment 4 | 0.2 | 0.04 | 0.05 | 0.05 | 0.02 | 0.002 | 0.85 | Balance | 84 | 155 | 69.9 | 58.0 | 218 |
| Embodiment 5 | 0.2 | 0.04 | 0.05 | 0.05 | 0.02 | 0.002 | 0.85 | Balance | 84 | 155 | 69.9 | 58.0 | 218 |
| Embodiment 6 | 0.3 | 0.05 | 0.1 | 0.09 | 0.03 | 0.01 | 0.4 | Balance | 87 | 183 | 72.0 | 57.7 | 216 |
| Embodiment 7 | 0.4 | 0.06 | 0.1 | 0.09 | 0.04 | 0.002 | 0.1 | Balance | 89 | 211 | 74.0 | 57.1 | 210 |
| Embodiment 8 | 0.2 | 0.04 | 0.05 | 0.05 | 0.02 | 0.002 | 0.85 | Balance | 84 | 155 | 69.9 | 58.0 | 218 |
| Embodiment 9 | 0.2 | 0.04 | 0 | 0 | 0.01 | 0 | 0.02 | Balance | 82 | 132 | 68.8 | 58.6 | 220 |
| Embodiment 10 | 0.01 | 0.01 | 0.1 | 0.09 | 0.01 | 0 | 0.02 | Balance | 81 | 119 | 68.2 | 59.8 | 226 |
| Embodiment 11 | 0.2 | 0.04 | 0.1 | 0.09 | 0.04 | 0.002 | 9.2 | Balance | 75 | 109 | 58 | 51 | 160 |

| | Si | Fe | Ni | Cu | Mn | Ti | Mg | Al | Impurity | Elastic modulus Gpa | Thermal conductivity coefficient W/m · K |
|---|---|---|---|---|---|---|---|---|---|---|---|
| Comparative example 1 | 0.03 | 0.05 | 0.004 | 0.004 | 0.06 | 0.002 | 99.6 | 0.05 | 0.2 | 35 | 110 |

An aluminum alloy material used for the conductive body 200*a* in the embodiments of the present disclosure includes the following components: 0.02% to 0.85% of Mg, 0.01% to 0.41% of Si, 0.01% to 0.04% of B, 0.01% to 0.062% of Fe, 0 to 0.096% of Zn, 0 to 0.0096% of Ti, 0 to 0.1% of Ni, 98.52% to 99.95% of Al, and impurities, where content of the impurities is ≤0.1%. It can be learned from data in Table 7 that for aluminum alloy materials made according to the foregoing component formulas in Embodiments 1 to 10, it is measured that the elastic moduli of the aluminum alloy materials are all in a range of 55 Gpa to 120 Gpa.

In the aluminum alloy material, Si and Fe are added, so that strengthening phases of $Al_3Fe$ and AlSiFe are formed in the aluminum alloy, thereby improving the material strength of the aluminum alloy. Si and Fe can improve the casting electrical conductivity≥57% IACS, and a thermal conductivity coefficient satisfying 200 W/m·K to 230 W/m·K, and have good mechanical properties and electrical conductivity, thereby resolving the problem that existing aluminum alloy materials have lower mechanical properties while having a better electrical conductivity. In addition, the aluminum alloy material has a smaller density than a copper material, and has advantages of a small density and a light weight. A conductive bar 200 manufactured by using the aluminum alloy material provided in the embodiments of the present disclosure satisfies lightweight development requirements of modern vehicles.

In addition, through the comparison between Embodiments 1 to 10 and Embodiment 11, the elastic modulus of the conductive bar 200 manufactured by using the aluminum alloy material provided in Embodiment 11 satisfies 55 Gpa to 120 Gpa. As shown in Experimental group 7, the thickness $\delta$ is adjusted to satisfy the feature expression (i), so that a conductive bar 200 with a small stress can be obtained. However, compared with the conductive bars 200 with the aluminum alloy formulas in Embodiments 1 to 10, the content of Mg in the aluminum alloy material formula provided in Embodiment 11 is up to 9.2%, and the electrical conductivity and the thermal conductivity coefficient of the obtained conductive bar 200 are both reduced. Compared with Embodiment 11, the conductive bars 200 in Embodiments 1 to 10 have both good mechanical properties and a better electrical conductivity, and have a better application prospect in vehicle electrical device systems.

Through the comparison between Embodiments 1 to 10 and Contrast example 1, the alloy material provided in Contrast example 1 has a small elastic modulus and a small thermal conductivity coefficient, which is not conducive to improving the mechanical properties and the heat dissipation effect of the conductive bar 200. The aluminum alloy materials in Embodiments 1 to 10 have thermal conductivity coefficients ranging from 200 W/m·K to 230 W/m·K, have a better electrical conductivity, and are further conducive to improving the heat dissipation effect of the conductive bar 200.

What is disclosed above is merely exemplary embodiments of the present disclosure, and certainly is not intended to limit the scope of the claims of the present disclosure. A person of ordinary skill in the art may understand that all or some of the processes of the foregoing embodiments are implemented, and equivalent variations made in accordance with the claims of the present disclosure still fall within the scope of the present disclosure.

What is claimed is:

1. A conductive bar, configured to be electrically connected between at least two electrical devices, the conductive bar comprising at least one connecting section, an elastic modulus of the connecting section being E, a width of the connecting section being $\omega$, a thickness of the connecting section being $\delta$, and the thickness $\delta$ of the connecting section satisfying about $\sqrt{\lambda\omega^3/E}$ to about $\leq 10\sqrt{\lambda\omega^3/E}$, wherein $\lambda$ equals to about 0.085 Gpa/mm, units of $\omega$ and $\delta$ are both mm, a unit of E is Gpa, and E is in a range of about 55 Gpa to about 120 Gpa.

2. The conductive bar according to claim 1, wherein a plurality of connecting sections are provided, the plurality of connecting sections comprise a first connecting section, a second connecting section, and a third connecting section, and the second connecting section and the third connecting section are arranged at two opposite ends of the first connecting section and are configured to be electrically connected to the two electrical devices.

3. The conductive bar according to claim 2, wherein an extending direction of the first connecting section is substantially parallel to a first direction, extending directions of the second connecting section and the third connecting section are substantially parallel to a second direction, and the first direction is substantially perpendicular to the second direction.

4. The conductive bar according to claim 3, having a substantially planar plate shape, the second direction being perpendicular to a thickness direction of the first connecting section.

5. The conductive bar according to claim 3, having a three-dimensional structure, the second direction being parallel to a thickness direction of the first connecting section.

6. The conductive bar according to claim 2, wherein the plurality of connecting sections further comprise a first transition section and a second transition section, the first transition section is connected between the first connecting section and the second connecting section, and the second transition section is connected between the first connecting section and the third connecting section.

7. The conductive bar according to claim 6, wherein an included angle between an extending direction of the second connecting section and an extending direction of the first connecting section ranges from about 45° to about 135°, and an included angle between an extending direction of the third connecting section and the extending direction of the first connecting section ranges from about 45° to about 135°.

8. The conductive bar according to claim 6, wherein a bending direction of the first transition section is opposite to a bending direction of the second transition section.

9. The conductive bar according to claim 6, wherein a fixing hole is provided in the first connecting section, the fixing hole penetrates the first connecting section along the thickness direction of the first connecting section, a first connecting hole is provided in the second connecting section, the first connecting hole penetrates the second connecting section along a thickness direction of the second connecting section, a second connecting hole is provided in the third connecting section, and the second connecting hole penetrates the third connecting section along a thickness direction of the third connecting section.

10. The conductive bar according to claim 2, wherein a fixing hole is provided in the first connecting section, the fixing hole penetrates the first connecting section along the thickness direction of the first connecting section, a first connecting hole is provided in the second connecting section, the first connecting hole penetrates the second connecting section along a thickness direction of the second connecting section, a second connecting hole is provided in the third connecting section, and the second connecting hole penetrates the third connecting section along a thickness direction of the third connecting section.

11. The conductive bar according to claim 1, comprising a conductive body and an abrasion-resistant layer covering a surface of the conductive body, and a roughness of the surface of the conductive body being Ra≤about 1.6 μm.

12. The conductive bar according to claim 11, wherein a material of the conductive body is an aluminum alloy, and the aluminum alloy comprises components of the following mass percentage: about 0.02% to about 0.85% of Mg, about 0.01% to about 0.41% of Si, about 0.01% to about 0.04% of B, about 0.01% to about 0.062% of Fe, about 0 to about 0.096% of Zn, about 0 to about 0.0096% of Ti, about 0 to about 0.1% of Ni, about 98.52% to about 99.95% of Al, and impurities, wherein content of the impurities is ≤about 0.1%.

13. The conductive bar according to claim 11, wherein a Vickers hardness of the surface of the conductive body is HV>about 38.

14. The conductive bar according to claim 11, further comprising a backing layer, the backing layer covering the surface of the conductive body, and the abrasion-resistant layer being arranged on a surface of the backing layer away from the conductive body.

15. The conductive bar according to claim 11, further comprising an insulating layer, and the insulating layer being arranged on a surface of the abrasion-resistant layer away from the conductive body.

16. The conductive bar according to claim 1, having a yield strength≥about 75 Mpa, a tensile strength≥about 114 Mpa, and an electrical conductivity≥about 57% IACS.

17. The conductive bar according to claim 1, having a thermal conductivity coefficient ranging from about 200 W/m·K to about 230 W/m·K.

18. A vehicle electrical device system, comprising two electrical devices and the conductive bar according to claim 1, and the conductive bar being electrically connected between the two electrical devices.

19. A conductive bar assembly, comprising a connecting substrate and a plurality of conductive bars, each configured to be electrically connected between at least two electrical devices, wherein each conductive bar comprises at least one connecting section, an elastic modulus of the connecting section is E, a width of the connecting section is ω, a thickness of the connecting section is δ, and the thickness δ of the connecting section satisfies about $\sqrt{\lambda\omega^3/E}$ to about $\leq 10\sqrt{\lambda\omega^3/E}$, wherein λ equals to about 0.085 Gpa/mm, units of ω and δ are both mm, a unit of E is Gpa, and E is in a range of about 55 Gpa to about 120 Gpa, and the plurality of conductive bars are all mounted on the connecting substrate and are spaced away from each other.

20. The conductive bar assembly according to claim 19, wherein a plurality of conductive bar groups include the plurality of conductive bars, each conductive bar group comprises a plurality of conductive bars, and the plurality of conductive bars of each conductive bar group are parallel to each other.

* * * * *